(12) United States Patent
Kumar et al.

(10) Patent No.: US 11,847,814 B2
(45) Date of Patent: Dec. 19, 2023

(54) VIDEO DATA SEARCH USING COLOR WHEEL ASSOCIATIONS

(71) Applicant: Dragonfruit AI, Inc., Menlo Park, CA (US)

(72) Inventors: Amit Kumar, Menlo Park, CA (US); Jonathan Mack, Menlo Park, CA (US)

(73) Assignee: DRAGONFRUIT AI, INC., Menlo Park, CA (US)

( * ) Notice: Subject to any disclaimer, the term of this patent is extended or adjusted under 35 U.S.C. 154(b) by 496 days.

(21) Appl. No.: 17/019,786

(22) Filed: Sep. 14, 2020

(65) Prior Publication Data

US 2022/0083594 A1 Mar. 17, 2022

(51) Int. Cl.
*G06K 9/46* (2006.01)
*G06V 10/56* (2022.01)
*G06F 16/783* (2019.01)
*G06F 16/71* (2019.01)

(52) U.S. Cl.
CPC .............. *G06V 10/56* (2022.01); *G06F 16/71* (2019.01); *G06F 16/785* (2019.01)

(58) Field of Classification Search
CPC ........ G06F 16/785; G06F 16/71; G06F 16/58; G06F 16/583; G06F 16/5838; G06V 10/56; G06V 10/235; G06V 20/52; G06V 2201/07; G06V 30/18105; G06T 7/90; G06T 7/223; G06T 7/231; G06T 7/248; G06T 7/269

See application file for complete search history.

(56) References Cited

U.S. PATENT DOCUMENTS

2012/0294522 A1* 11/2012 Ueda ................. G06V 10/56
                                                     382/165
2020/0394395 A1* 12/2020 Ong .................. G06V 40/20

* cited by examiner

*Primary Examiner* — Duy M Dang (57) ABSTRACT

Systems, methods, and software described herein to manage preferences for video search. In one implementation, a video processing service may receive a request for video data that satisfies one or more criteria, wherein the one or more criteria includes at least one color for an object. In response to the request, the video processing service may identify one or more secondary colors associated with the at least one color and update the one or more criteria to include the one or more secondary colors. The video processing service may then select the video data from a video source that satisfies the updated one or more criteria.

19 Claims, 6 Drawing Sheets

VIDEO DATA SEARCH USING COLOR WHEEL ASSOCIATIONS

BACKGROUND

Video capture devices, such as smartphones and dedicated cameras, can capture video data for a variety of applications. These applications may include entertainment, video surveillance, or some other application, wherein each of the applications may use data from one or more video capture devices. For example, a video surveillance system for an intersection may use multiple cameras to capture different angles and different information about the traffic patterns for vehicles and pedestrians at the intersection.

However, as the number of capture devices is increased or the amount of video data from the devices is increased, difficulties can arise in identifying relevant objects in the data. Even with the use of video processing applications, a user may struggle with describing an object to permit the video processing application to identify the object or may not have enough information about the object to accurately describe the object for search by the video processing application.

Overview

Provided herein are systems, methods, and software for managing video data search using color wheel associations. In one implementation, a method of operating a video processing system includes receiving a request for video data that meets one or more criteria, wherein the one or more criteria comprises at least one color selection for an object in the video data. The method further includes identifying one or more second colors related to the at least one color based at least on a color wheel relationship, updating the one or more criteria to permit the object to be the color or the one or more second colors, and selecting the video data from a video database that satisfies the updated one or more criteria.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
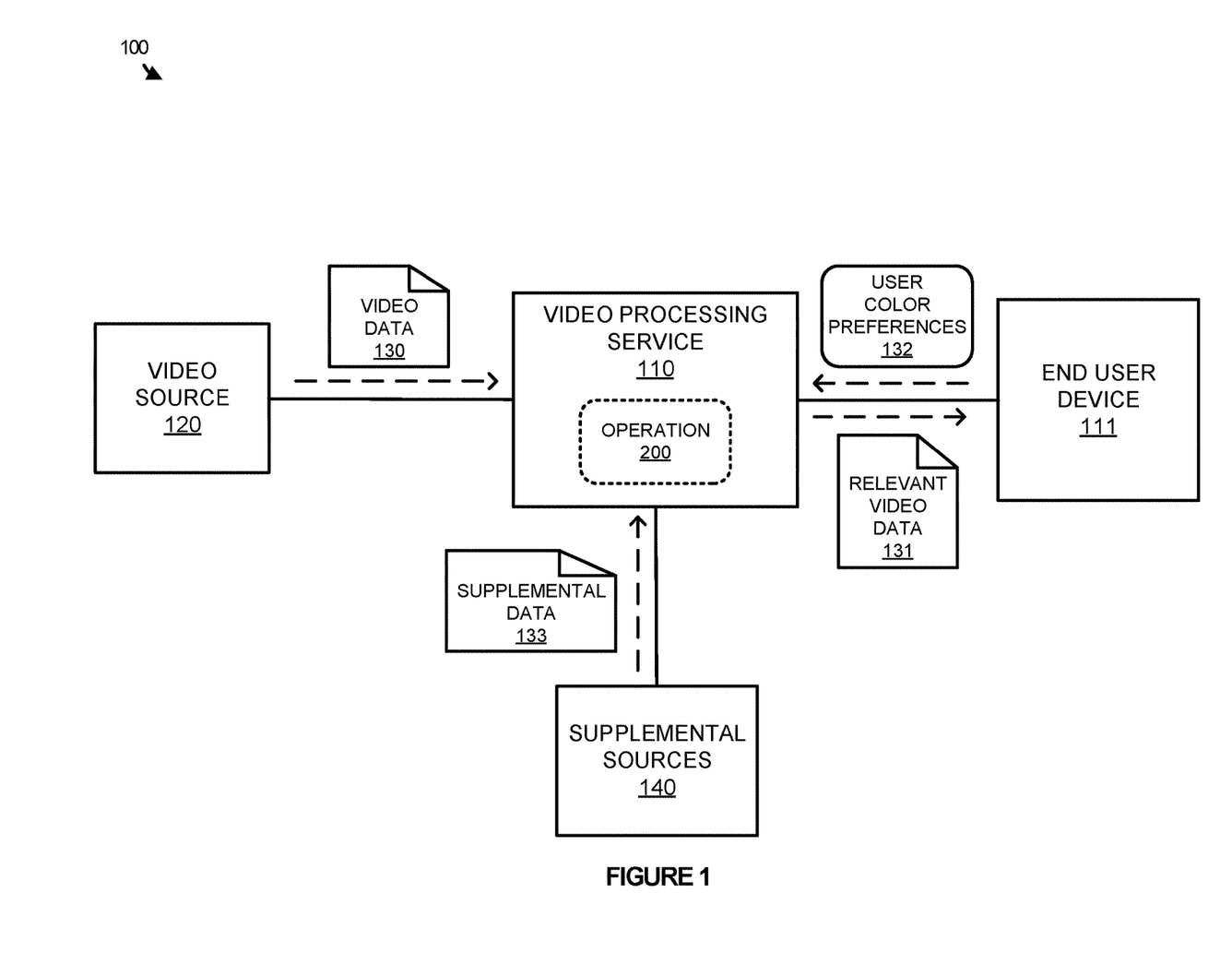
FIG. 1 illustrates computing environment to manage video processing and object identification according to an implementation.

FIG. 1 illustrates computing environment 100 to manage video processing and object identification according to an implementation. Computing environment 100 includes video source(s) 120, video processing service 110, end user device 111, supplemental sources 140, video data 130, relevant video data 131, user color preferences 132, and supplemental data 133. Video processing service 110 provides operation 200, which is further described below with respect to FIG. 2. Video processing service 110 may execute across one or more physical computing systems, such as server computing systems, desktop computing systems, or some other computing system. Video processing service 110 may reside on a local computing network or may reside in a cloud computing environment or remote server environment.

In operation, end users, such as a user at end user device 111, may generate requests for relevant video data from video source 120. Video source 120 may represent a video storage repository, one or more video cameras, or some other video source for processing by video processing service 110. In generating requests to video processing service 110, end user device 111 may provide preferences associated with video data of interest for the user. The preferences may include timestamps for the relevant video data, descriptions or identifiers for objects of interest, such as vehicles, products, persons, and the like, colors for the objects of interest, or some other preference associated with the video data.

Here, end user device 111 provides user color preferences 132 to video processing service 110. In response to the request with the user color preferences, video processing service 110 identifies one or more secondary colors associated with the color preferences. In some implementations, video processing service 110 may consider similarity factors to the one or more first colors supplied by the end user. In some examples, the similarity factors may include the proximity of the one or more first colors to other colors in a color wheel, wherein a color wheel comprises a representation of different colors arranged according to their chromatic relationship. For example, a color wheel may be divided into a plurality of different colors, as further demonstrated in FIGS. 3A-3B. When a user selects a color in the color wheel, one or colors that are in near proximity to the selected color may also be identified as possible colors for the video search. In some examples, the similarity factors may further include previous user selections of colors related to the one or more first colors, related colors based on the object of interest for the one or more first colors, or some other factor. These similarity factors may be based on supplemental data 133 that is provided and maintained from supplemental sources 140.

Figure 2:
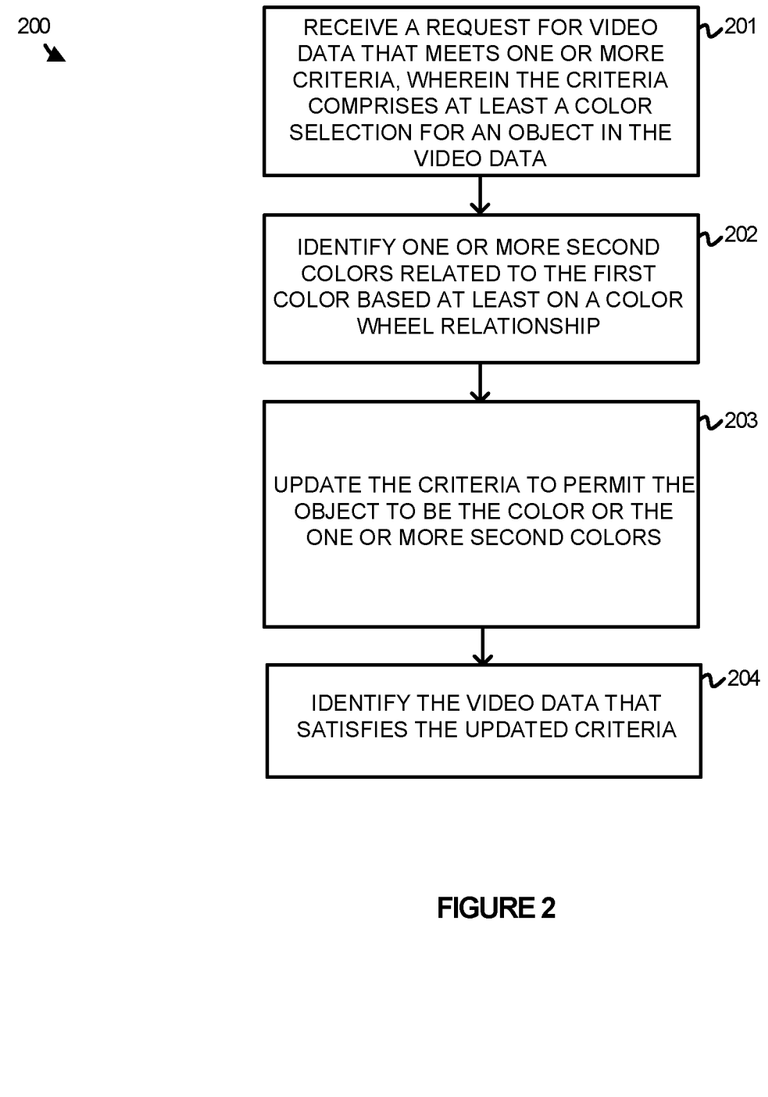
FIG. 2 illustrates an operation of a video processing service to manage object identification according to an implementation.

In some implementations, in addition to or in place of identifying other colors for the video search, video processing service 110 may perform similar operations to identify other related objects for a video search. The other related objects may comprise products, objects of interest, or some other related object. For example, a user may provide a request with preferences for a brand of vehicle. In response to the request, video processing service 110 may obtain supplemental data 133 that can correspond to other related brands, similar selections of other users, or some other similarity factor to identify similar brands to the user selection. In response to identifying the similar brands, video processing service 110 may generate a display for the user that indicates the identified brands and permits the user to select a subset of the similar brands for the search. Alternatively, video processing service 110 may automatically include the FIG. 2 illustrates an operation 200 of a video processing service to manage object identification according to an implementation. The steps of operation 200 are referenced parenthetically in the paragraphs that follow with reference to systems and elements of computing environment 100 of FIG. 1.

As depicted, operation 200 includes receiving (201) a request for video data that meets one or more criteria, wherein the one or more criteria comprises at least one color selection for an object in the video data. For example, a user at user device 111 may be presented with an interface that permits the user to select preferences or criteria for video data of interest. The interface may include drop-down menu, a text box, a color wheel, or some other interface to select preferences for video data from video source(s) 120. The preferences may include objects of interest, such as vehicles, products, or some other objects, time periods of interest, colors for the objects, or some other preferences, including combinations thereof. In some implementations, a selection of a color may be made using a color wheel or gradient, wherein the user is not required specify a name of the color but select a color that most accurately reflects the color of interest.

Once the criteria are defined, video processing system 110 identifies (202) one or more second colors related to the at least one color based at least on a color wheel relationship. In some implementations, when the user selects a color or colors for an object, related color shades may be identified in a color wheel. For example, a color wheel may include a plurality of possible color selections for a user. When a user selects a color, other colors that are near the selected color in the color wheel may also be selected and displayed to the user, wherein the user may verify the additional colors, remove the additional colors, or provide some other feedback associated with the colors. In some implementations, the additional colors may be selected without displaying and receiving feedback from the user. In some examples, in addition to using the proximity of the additional colors to the selected color in the color wheel, video processing service 110 may further consider supplemental data 133 from supplemental sources 140. Supplemental sources 140 may represent one or more databases that store information about objects or color tendencies. Supplemental data 133 may include user feedback from one or more users about related colors, information about common colors for objects, information for colorblind issues, or some other supplemental data. For example, if user desires to find a car that is a shade of green, supplemental sources 140 may include a database of greens that are frequently chosen in association with cars, greens that were available in association with the car, or some other information associated with the car. The identified colors using the color wheel and/or the information from supplemental sources 140 may then be presented to the user for verification or prepared to be used for the search without the verification of the user.

Once the one or more second colors are identified, operation 200 further updates (203) the one or more criteria to permit the object to be the at least one selected color from the user or the one or more second colors identified from the color wheel or the supplemental data. After updating the criteria, video processing service 110 may select (204) the video data from a video database or source that satisfies the updated one or more criteria. For example, a user may generate a request video with cars associated with a shade of green. In response to the request, video processing service 110 may identify colors related to the shade of green and may initiate a search of a video database to identify video data that includes cars with both the initially requested shade and the one or more additional colors identified by video processing service 110.

In some implementations, the video search and selection of the second colors may be based on probabilities and predictive modeling from previous user searches and/or a database regarding the item of interest. For example, the video search may identify that the user frequently mistakes a first color with a second color and may suggest the second color to be used in the search of the video data. In another example, the video processing service may identify the type of object of interest and determine other probabilistic colors that could correspond to the object of interest. Returning to the example of a search for a car, the video processing service may obtain a user selection that indicates the color red, however, the service may determine that the user may have desired maroon or orange based on the available colors for the type of car selected, based on other user selections in association with the type of car, or based on some other factor.

Although demonstrated in the previous example using colors, it should be understood that similar operations may be used to search for other related objects to a user request. These additional objects may include shapes, brands, or some other related object. For example, a user may request video data with products associated with a particular shape. In response to the request, video processing service 110 may identify one or more related shapes to the shape. The related shapes may be based on similarities to the current shape (e.g., an ellipse in place of a circle), the shape of other related products to the current product, previous selections of one or more users to identify related shapes, or based on some other factor. In some implementations, the related shapes may be presented to the requesting end user, permitting the requesting end user to verify the proposed additional selections. In other implementations, video processing service 110 may search using the related selections and provide video data with the related selections.

Figure 3A:
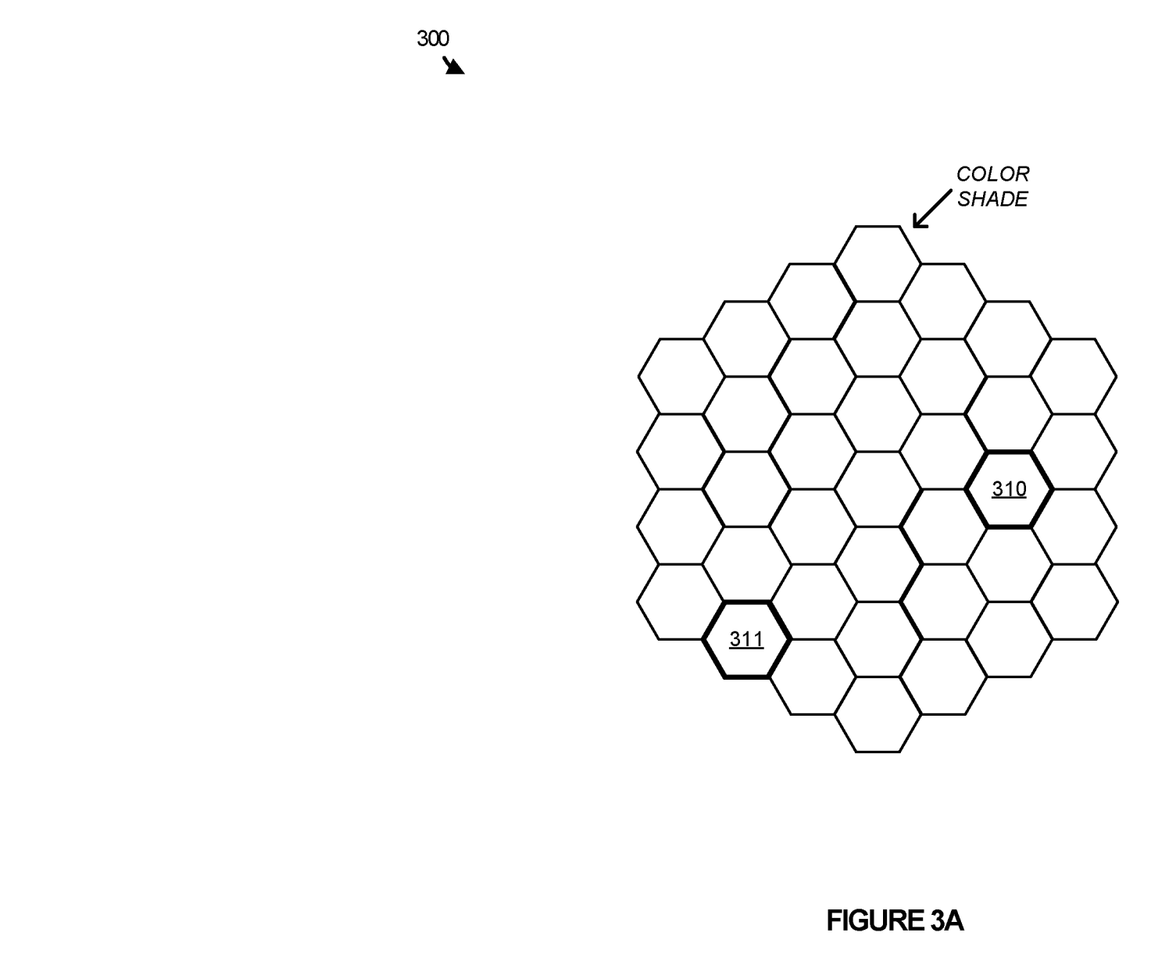
FIGS. 3A-3B illustrate an operational scenario of selecting and presenting color operations for an object according to an implementation.
Figure 3B:
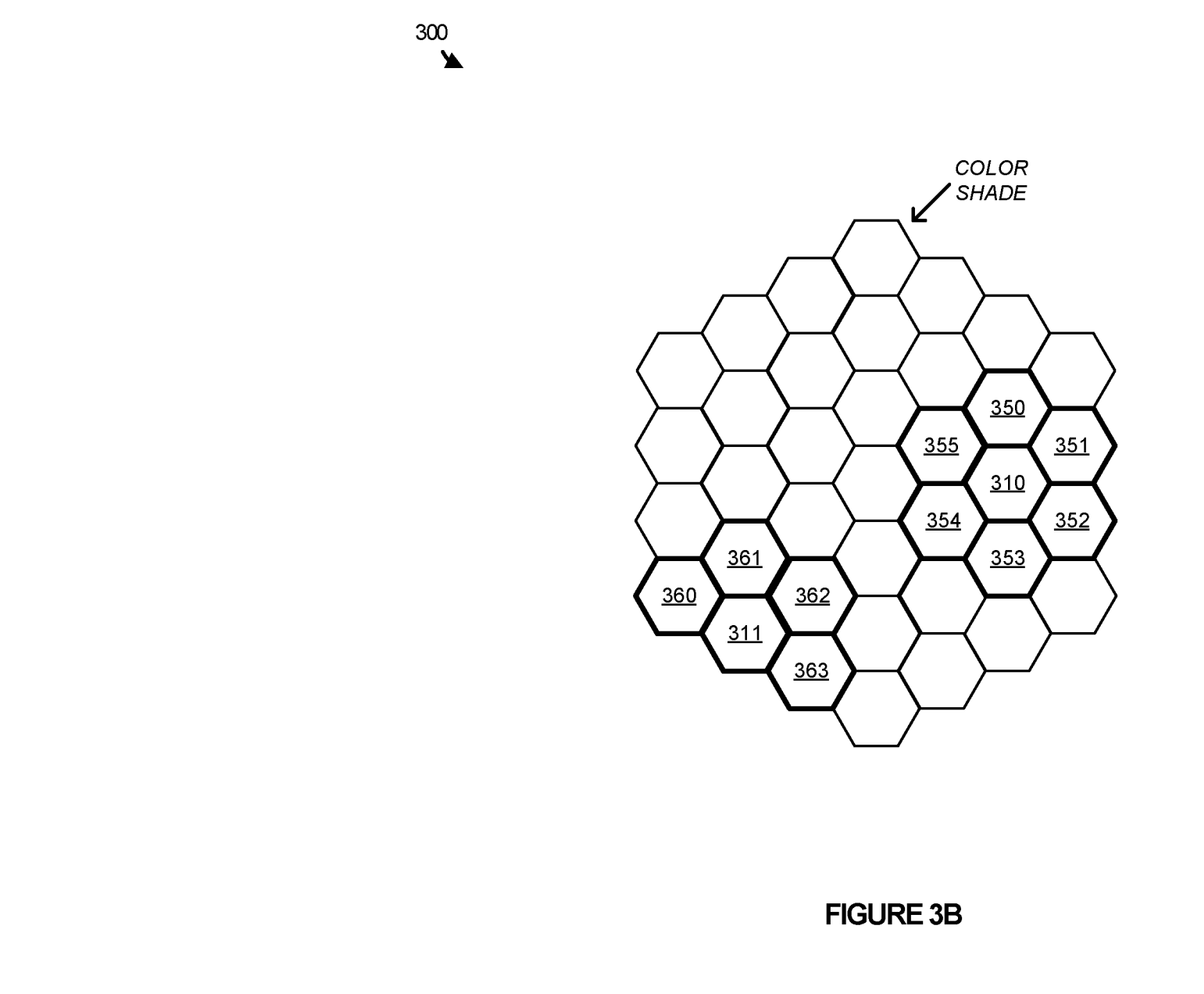

FIGS. 3A-3B illustrate an operational scenario of selecting and presenting color operations for an object according to an implementation. FIGS. 3A-3B include a color wheel 300, which is used to present a user with a visual representation of colors arranged according to their chromatic relationship. Color wheel 300, which may also be referred to as a color circle may include the full range of colors or may include a subset of colors. For example, the color wheel may only include color shades related to green, blue, and purple.

Referring first to FIG. 3A, a video processing system may provide a user with selections to search video data for objects of interest. In selecting the attributes of an object or objects of interest, the video processing system may generate a display that permits the user to select one or more colors from color wheel 300. Here, the user selects colors 310-311 related to one or more objects of interest.

Turning to FIG. 3B, once a user selects colors 310-311, the video processing system may identify one or more second colors related to colors 310-311 based on one or more similarity factors. The similarity factors may include the proximity of the second colors to the first user selected colors in a color wheel, based on user selections of the second colors when selecting the first colors, based on the object type for the colors, based on color mistake tendencies (e.g., color blindness), or based on some other factor. Here, the video processing system selects colors 350-355 in association with color 310 and colors 360-363 in association with color 311. Once the colors are selected, the video processing system may present the second colors as a suggestion to the requesting end user. Once presented, the user may accept or decline each of the colors prior to running a search for video data related to the colors. In other implementations, rather than providing the suggestions to the user, a search may be initiated with the additional colors incorporated as part of the search criteria.

Although demonstrated in the previous example using colors, it should be understood that similar techniques may be employed for other video and image search preferences provided by a user. The preferences may be related to similar object shapes, brands, or some other preference for the end user. For example, a user may specify that they are looking for a sphere and the video processing service may identify similarity factors to determine whether any other shapes should be included in the search criteria for the user. The similarity criteria may include one or more colors provided by the user, which may suggest different shapes (e.g., based on a brand), based on other user selections of similar shapes, or based on some other factor.

Figure 4:
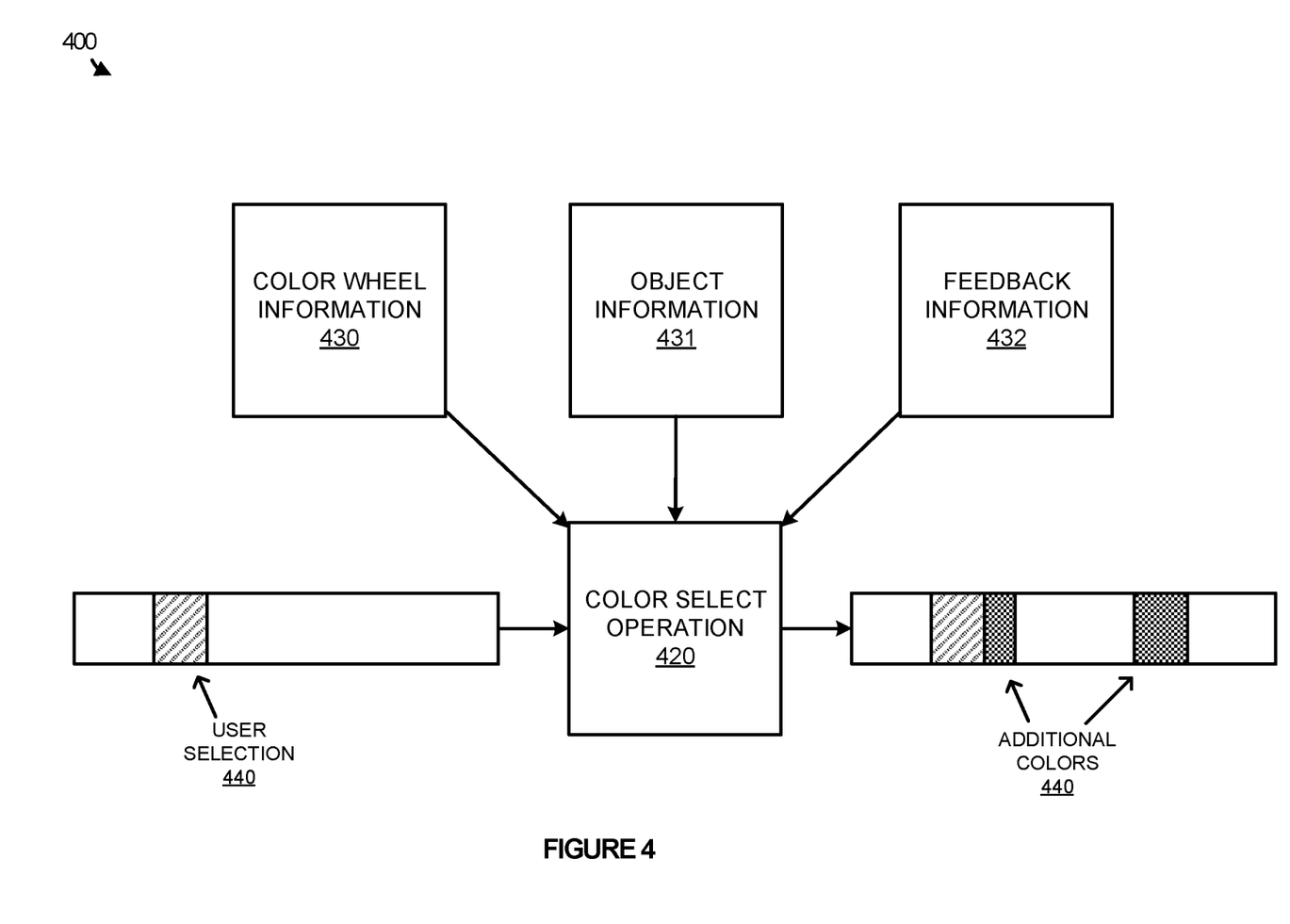
FIG. 4 illustrates an operational scenario of selecting colors for an object according to an implementation.

FIG. 4 illustrates an operational scenario 400 of selecting colors for an object according to an implementation. Operational scenario 400 includes a color range 402, information 430-432, user selection 440, and color select operation 420.

In operation, a video processing service may provide a user interface that permits a user to select one or more preferences to identify video data of interest. The video data of interest may be identified from sources, such as a video database or one or more cameras that are coupled to the video processing service. In one implementation, the interface may permit a user to select one or more colors, wherein the selection includes user selection 440 depicted in color range 402. Other preferences selected by the user may include object type, brand of object, time periods of interest, or some other preference of the end user. Once the user selects the preferences, the video processing service provides color select operation 420 to identify one or more second colors related to user selection 440. The color select operation may consider a variety of factors, include color wheel information 430 to identify colors in proximity to the user selected colors in a color wheel, object information 431 to identify colors relevant to the object of interest for the user, and feedback information 432 to identify colors. Although these are sample factors for determining the one or more additional colors for a search, it should be understood that other similarity factors may be considered by the video processing system.

Once additional colors 440 are identified from information 430-432, color select operation 420 may provide an interface that indicates additional colors 440 to a user. The colors may be provided to the user overlaid on the user selection or may be provided using another interface. For example, a user may be provided with a color wheel that permits the user to select one or more colors from the wheel. Once selected, the video processing service may return and display the additional colors related to the selected color. After displaying additional colors 440, the user may select a subset of additional colors 440 for the search. In some implementations, rather than providing additional colors 440 for confirmation by the user, the video processing system may add additional colors 440 to the search criteria automatically and perform the search for the required video using the updated search criteria. For example, if a user selected a shade of green for a vehicle in the video data, the video processing service may add additional shades of green (or other colors) to the search criteria for the vehicle based on information 430-432. Using image recognition software, the video processing service may identify the relevant objects in the video data and provide the video data to the requesting user. In some implementations, the video processing service may search each of the frames individually, however, the video processing system may search a subset of the frames to find the relevant objects.

Although demonstrated in the example of FIG. 4 as identifying colors related to user selected colors, it should be understood that similar operations may be performed to identify similar shapes of objects, brands associated with objects, or some other information for objects. In one implementation, a user may be presented with a dropdown menu, an array of selectable items, or some other display that permits the user to select one or more information elements associated with an object. For example, an array of available object shapes may be presented to a user as part of the preferences for searching video data associated with a video source. As the user selects one or more items on the display, the video processing service may identify one or more other items based on similarity factors to the selection. The similarity factors may include previous user selections related to the user selected item (e.g., selecting an ellipse in addition to a circle for an object shape), proximity or similarities between the currently selected item and the suggested items, or some other factor. As the one or more similar items are identified to the user selection, the similar items may be displayed to the user, permitting the user to verify the suggestions of the similar items. Returning to the example, of the user searching for a circular shaped object, the video processing service may generate a display of the suggestion, wherein the suggestion may be indicated via a highlighted option, an increased size for the option, or some other method of promoting the option. For instance, if the circle was selected from an array of available shapes, the suggested shapes may be highlighted in the array to permit the user to verify the suggested items. Once verified, the video processing service may initiate a search for video data related to the selected items.

Figure 5:
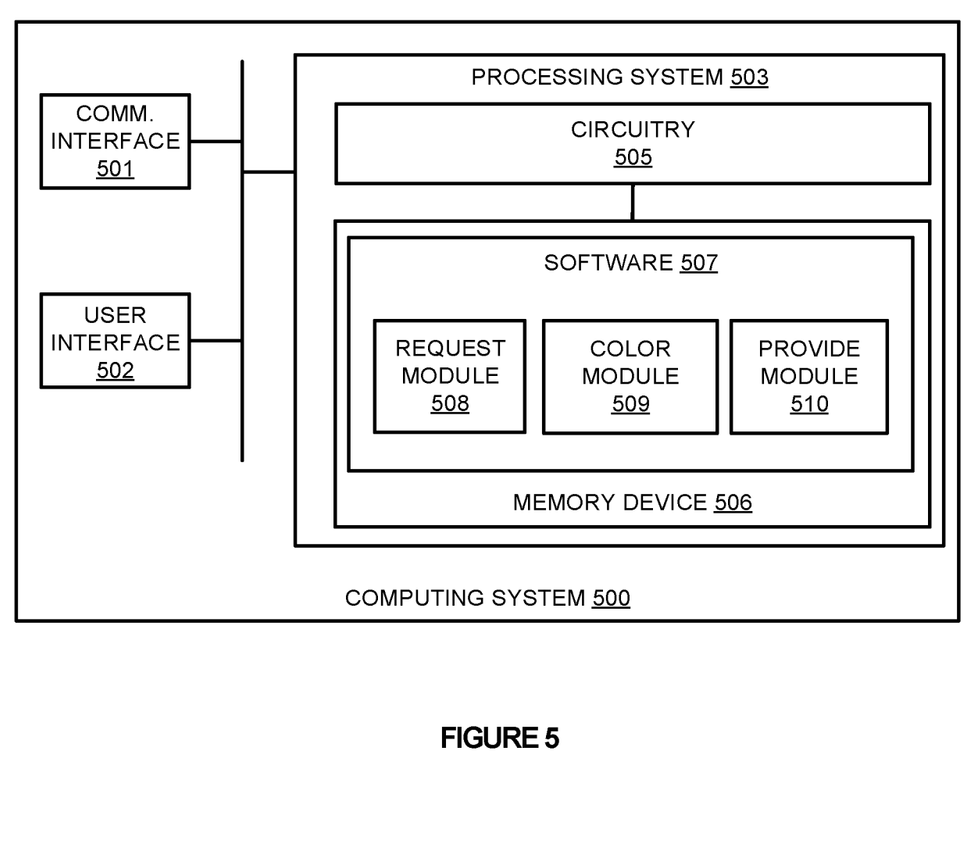
FIG. 5 illustrates a computing system to manage color selection according to an implementation.

FIG. 5 illustrates a computing system 500 to manage color selection according to an implementation. Computing system 500 is representative of any computing system or systems with which the various operational architectures, processes, scenarios, and sequences disclosed herein for a video processing service, such as video processing service 110 of FIG. 1. Computing system 500 comprises communication interface 501, user interface 502, and processing system 503. Processing system 503 is linked to communication interface 501 and user interface 502. Processing system 503 includes processing circuitry 505 and memory device 506 that stores operating software 507. Computing system 500 may include other well-known components such as a battery and enclosure that are not shown for clarity.

Communication interface 501 comprises components that communicate over communication links, such as network cards, ports, radio frequency (RF), processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In some implementations, communication interface 501 may be configured to communicate with one or more storage locations capable of storing video data in a variety of different formats. In some examples, communication interface 501 may communicate with a client or user device, wherein the client device may request video data from the various different storage locations.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. In some implementations, user interface 502 may permit a user to request and process various video data stored in multiple storage locations. User interface 502 may be omitted in some examples.

Processing circuitry 505 comprises microprocessor and other circuitry that retrieves and executes operating software 507 from memory device 506. Memory device 506 may include volatile and nonvolatile, removable and non-removable media implemented in any method or technology for storage of information, such as computer readable instructions, data structures, program modules, or other data. Memory device 506 may be implemented as a single storage device but may also be implemented across multiple storage devices or sub-systems. Memory device 506 may comprise additional elements, such as a controller to read operating software 507. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 505 is typically mounted on a circuit board that may also hold memory device 506 and portions of communication interface 501 and user interface 502. Operating software 507 comprises computer programs, firmware, or some other form of machine-readable program instructions. Operating software 507 includes request module 508, color module 509, and provide module 510, although any number of software modules may provide the same operation. Operating software 507 may further include an operating system, utilities, drivers, network interfaces, applications, or some other type of software. When executed by processing circuitry 505, operating software 507 directs processing system 503 to operate computing system 500 as described herein.

In one implementation, request module 508 directs processing system 503 to receive a request for video data that meets one or more criteria. In some implementations, the criteria may include at least one color selection associated with an object in the video data. For example, a user may be provided with a color wheel that permits the user to select one or more colors of interest in association with an object. The object may comprise a physical shape, may comprise a brand or type of object, or may comprise some other description of an object or objects. The object may be selected from one or more dropdown menus, an array of available objects, a text box, or some other interface provided by computing system.

In response to the request, color module 509 directs processing system 503 to identify one or more second colors related to the at least one color based at least one a color wheel relationship. A color wheel comprises a representation of different colors arranged according to their chromatic relationship. An example is represented in FIGS. 3A-3B, which demonstrate different hexagons that each represent a different color or shade of color. Once a selection is submitted by a user for a particular color, color module 509 may identify one or more other colors that are related to the selected color based on the proximity to the selection in the color wheel. In some implementations, in addition to or in place of the relationship in the color wheel, color module 509 may consider other similarity factors, including other user selections related to the current user selection, common color mistake tendencies from users, similar colors based on the object to be searched, or some other similarity factor.

Once the one or more second colors are identified in association with the at least one color selected by the user, color module 509 directs processing system 503 to update the one or more criteria to permit the object to be the at least one color and the one or more second colors. In some implementations, prior to updating the criteria, a notification may be provided to the user indicating one or more suggested colors to be added to the search criteria for the video data. The one or more suggested colors may be highlighted in the color wheel with the selected colors or may be provided in some other notification that indicates the suggested colors to the end user. Once provided, the user may select a subset of the one or more suggested colors as the one or more second colors to be added to the search criteria. After the criteria is updated with the one or more second colors, provide module 510 may direct processing system 503 to select the video data from a video source that satisfies the updated one or more criteria. In some implementations, provide module 510 may perform image recognition operations one frames of video data to identify the one or more objects of interest for the user provided in the search criteria.

Although demonstrated in the previous examples as identifying colors related to a user selected color, it should be understood that computing system 500 may perform similar operations to identify other related attributes for a user search. The related attributes may be associated with a shape of the object, a brand of an object, or some other attribute related to an object in a video search. For example, a user may be presented with an array of available object shapes to search for in a video database. In response to a selection of a shape, the computing system 500 may identify other shapes related to the user selected shapes based on similarity factors, wherein the similarity factors may include previous user selections in association with the selected shape, similarities between the selected shape and the other shape, differences in brands between the selected shape and other shapes, or some other similarity factor. Once one or more similar shapes are identified, the one or more shapes may be provided as a suggestion to the user, wherein the user may select at least a subset of the suggested shapes for searching the video data.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   receiving a request for video data that meets one or more criteria, wherein the one or more criteria comprises at least one color selection for an object in the video data;
   identifying one or more second colors related to the at least one color based at least on a color wheel relationship;

updating the one or more criteria to permit the object to be the at least one color or the one or more second colors; and selecting the video data from a video source that satisfies the updated one or more criteria.

2. The method of claim 1, wherein identifying the one or more second colors related to the at least one color is further based on user selections for colors associated with the at least one color in previous requests.

3. The method of claim 1, wherein identifying the one or more second colors related to the at least one color is further based on an object type associated with the object.

4. The method of claim 1, wherein identifying the one or more second colors related to the at least one color is further based on color mistake tendencies.

5. The method of claim 1, wherein identifying the one or more second colors related to the at least one color based at least on the color wheel relationship comprises:

identifying one or more third colors related to the at least one color based at least on the color wheel relationship;

generating, for display, an indication of the one or more third colors;

receiving a selection of the one or more second colors from the one or more third colors.

6. The method of claim 5 further comprising storing the selection of the one or more second colors.

7. The method of claim 1 further comprising generating a display of the color wheel, wherein the at least one color selection occurs in the displayed color wheel.

8. The method of claim 1 further comprising generating, for display, an indication of the one or more second colors as part of the color wheel.

9. A computing apparatus comprising:

one or more non-transitory computer readable storage media;

at least one processor operatively coupled to the one or more non-transitory computer readable storage media; and program instructions stored on the that, when executed by the at least one processor, direct the computing apparatus to:

receive a request for video data that meets one or more criteria, wherein the one or more criteria comprises at least one color selection for an object in the video data;

identify one or more second colors related to the at least one color based at least on a color wheel relationship;

update the one or more criteria to permit the object to be the at least one color or the one or more second colors; and select the video data from a video source that satisfies the updated one or more criteria.

10. The computing apparatus of claim 9, wherein identifying the one or more second colors related to the at least one color is further based on user selections for colors associated with the at least one color in previous requests.

11. The computing apparatus of claim 9, wherein identifying the one or more second colors related to the at least one color is further based on an object type associated with the object.

12. The computing apparatus of claim 9, wherein identifying the one or more second colors related to the at least one color is further based on color mistake tendencies.

13. The computing apparatus of claim 9, identifying the one or more second colors related to the at least one color based at least on the color wheel relationship comprises:

identifying one or more third colors related to the at least one color based at least on the color wheel relationship;

generating, for display, an indication of the one or more third colors;

receiving a selection of the one or more second colors from the one or more third colors.

14. The computing apparatus of claim 13, wherein the program instructions further direct the computing apparatus to store the selection of the one or more second colors.

15. The computing apparatus of claim 9, wherein the program instructions further direct the computing apparatus to generate a display of the color wheel, wherein the at least one color selection occurs in the displayed color wheel.

16. The computing apparatus of claim 9, wherein the program instructions further direct the computing apparatus to generate, for display, an indication of the one or more second colors as part of the color wheel.

17. A system comprising:

one or more video sources;

a video processing service executing on at least one computer communicatively coupled to the one or more video sources, the video processing service configured to:

receive a request for video data that meets one or more criteria, wherein the one or more criteria comprises at least one color selection for an object in the video data;

identify one or more second colors associated with the at least one color based on one or more similarity factors, wherein the one or more similarity factors comprise proximity to the at least one color in a color wheel;

update the one or more criteria to permit the object to be the at least one color or the one or more second colors; and select the video data from the one or more video sources that satisfies the updated one or more criteria.

18. The system of claim 17, wherein the one or more similarity factors further comprise user selections for colors associated with the at least one color in previous requests or an object type associated with the object.

19. The system of claim 17, wherein identifying the one or more second colors associated with the at least one color based on the one or more similarity factors comprises:

identifying one or more third colors related to the at least one color based at least on the one or more similarity factors;

generating, for display, an indication of the one or more third colors;

receiving a selection of the one or more second colors from the one or more third colors.

* * * * *